United States Patent Office 2,999,938
Patented Sept. 12, 1961

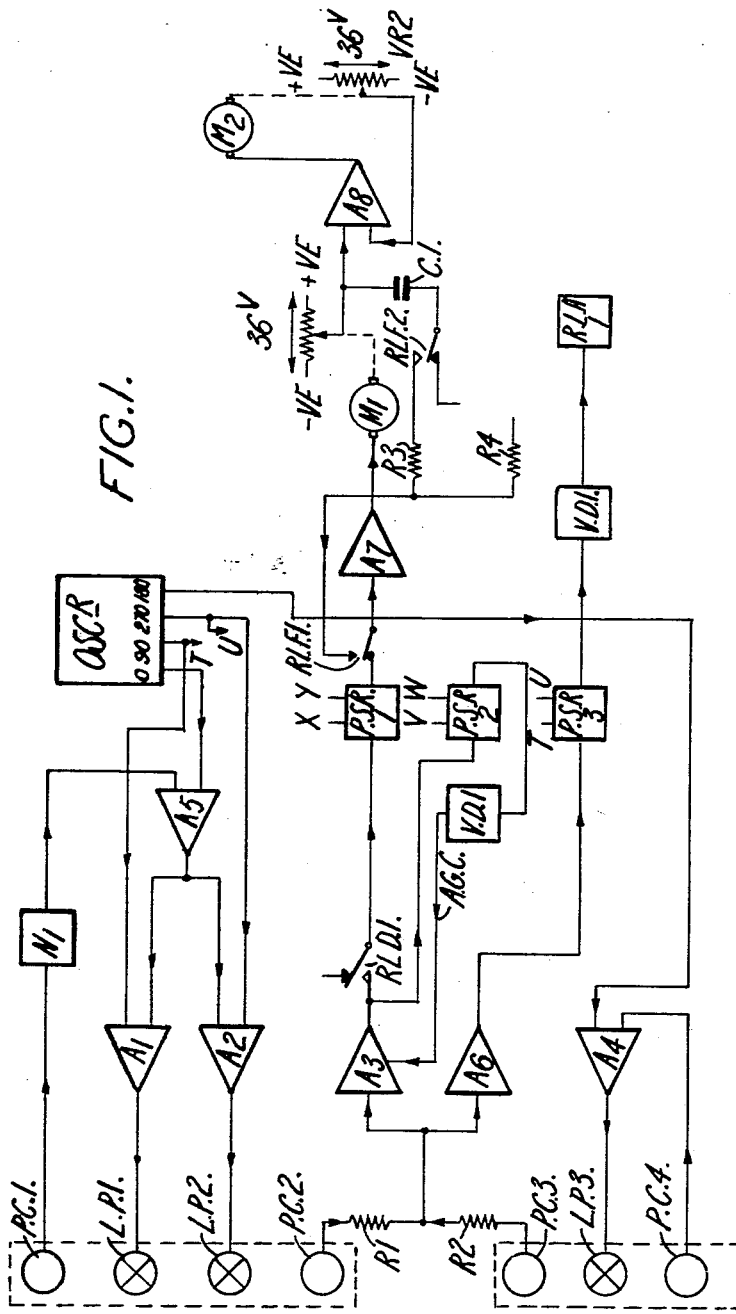

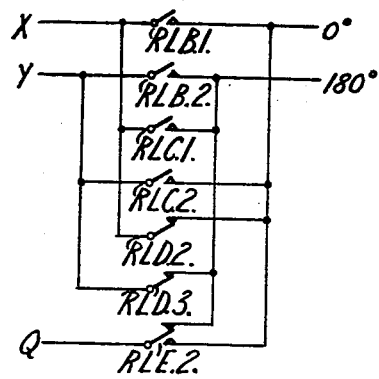
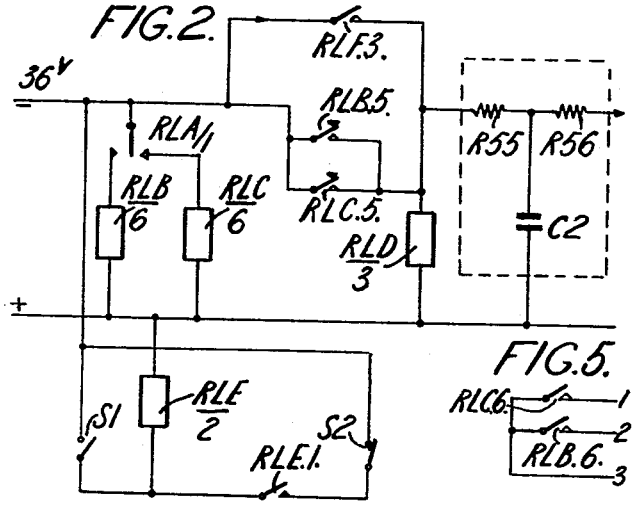
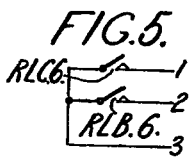
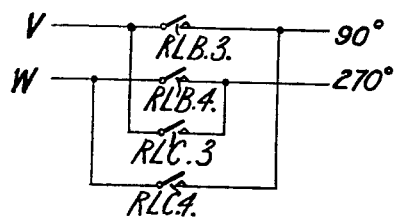

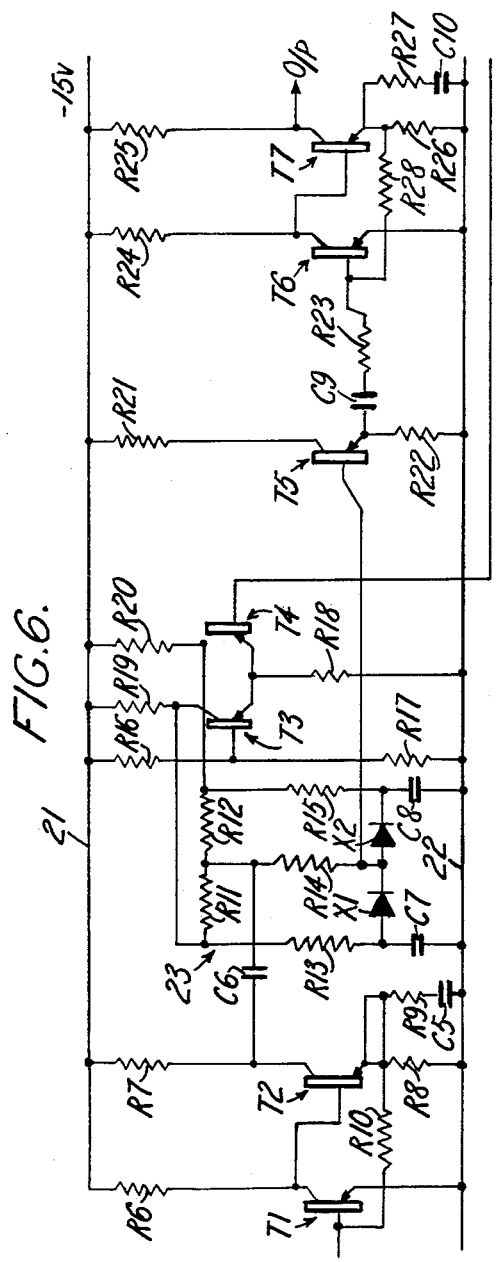

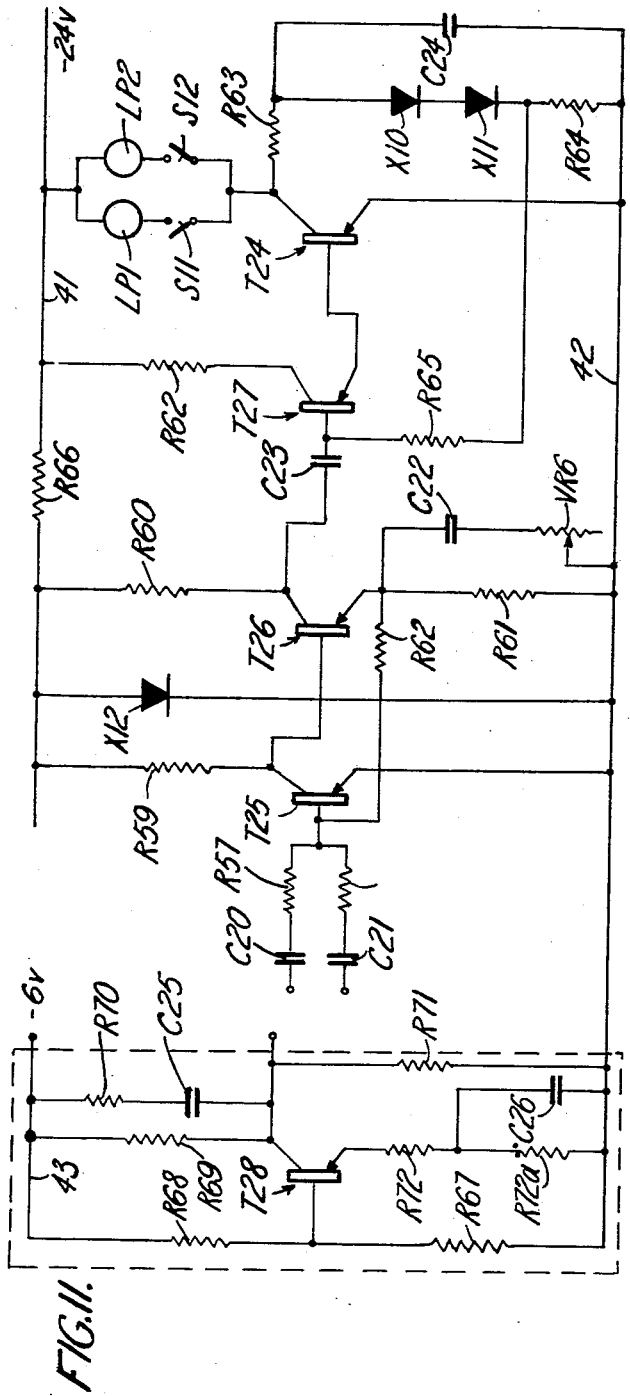

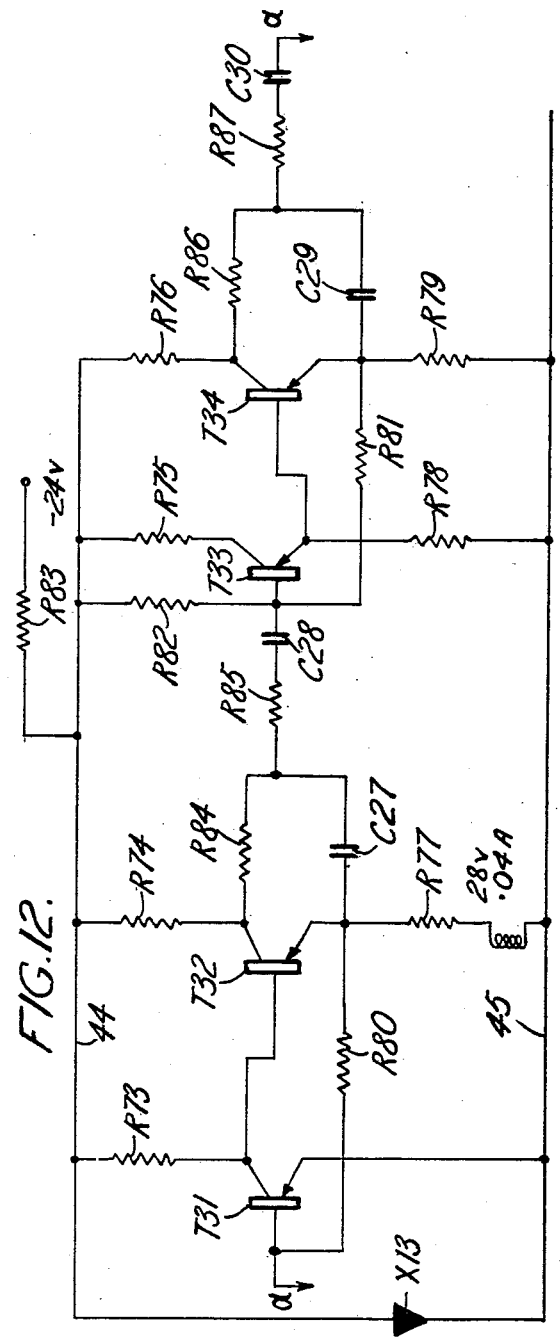

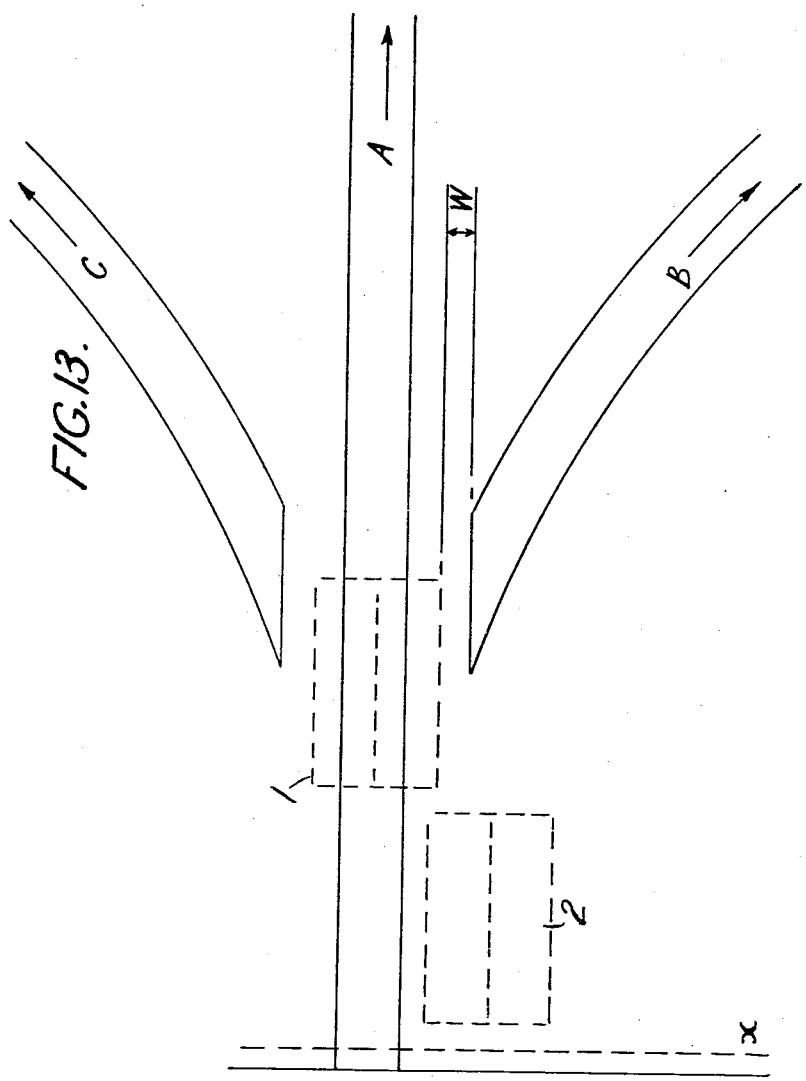

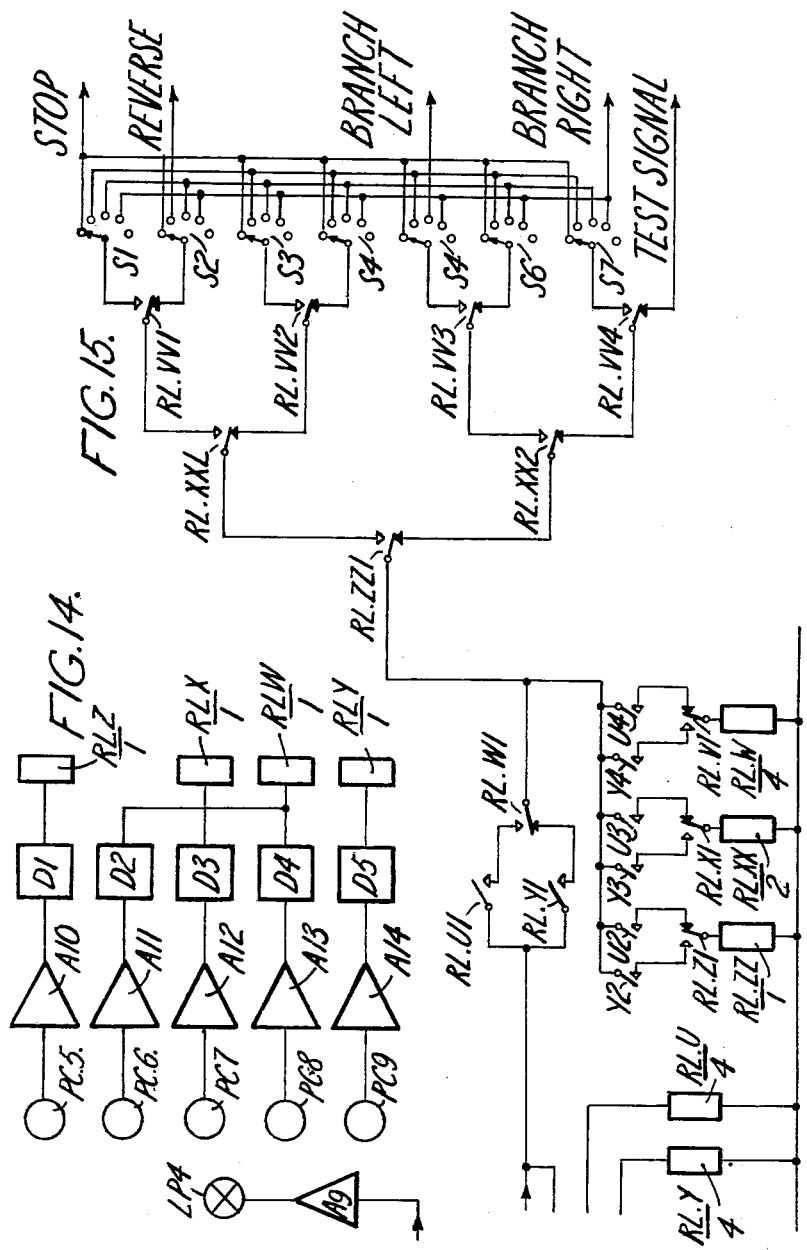

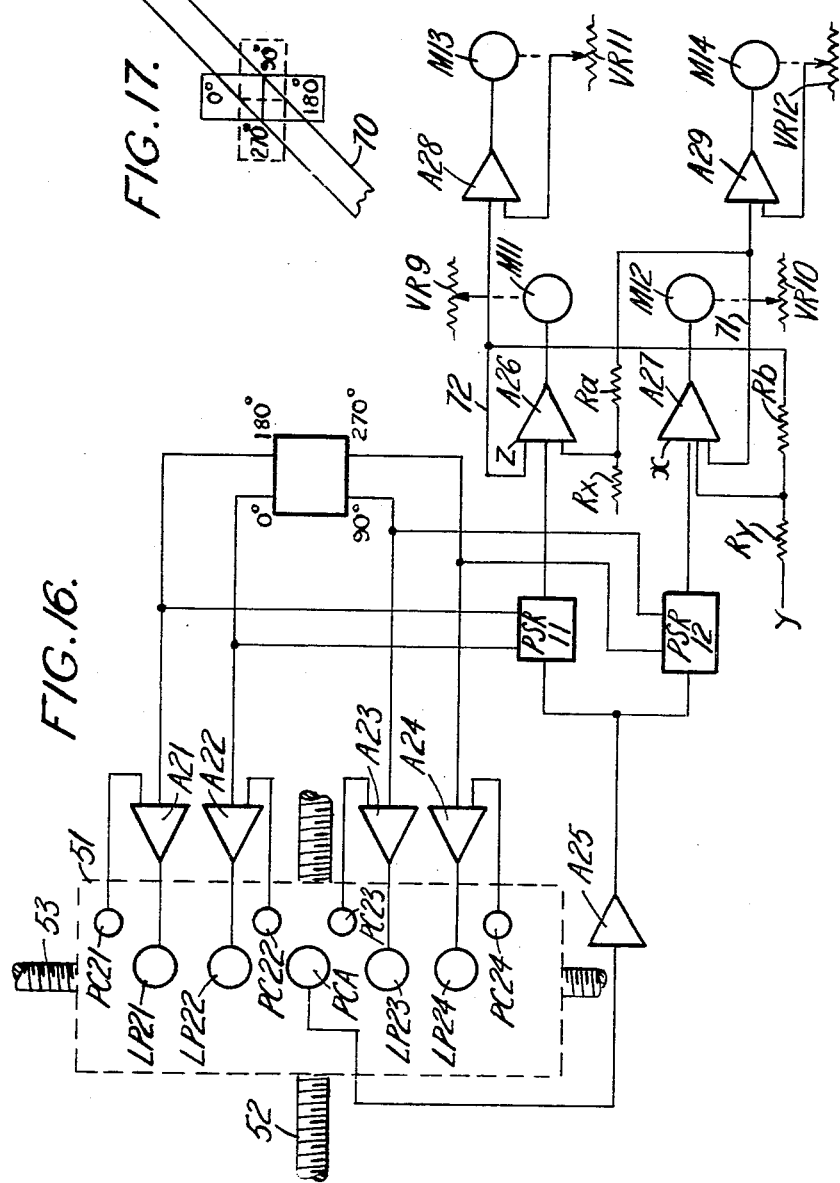

2,999,938
AUTOMATIC LINE FOLLOWER
Arthur Hann, Henry Robert Legge, and Frank Alfred Richards, Luton, England, assignors to Hunting Engineering Limited, Bedfordshire, England, a British company
Filed Apr. 21, 1959, Ser. No. 807,872
Claims priority, application Great Britain Apr. 22, 1958
26 Claims. (Cl. 250—202)

The invention relates to machines and is more particularly concerned with machines of the kind in which the direction of movement of the machine itself or the direction of movement of a part of the machine, can be controlled. An example of such a machine in which direction of movement of the machine itself can be controlled is a steerable vehicle and an example of a machine in which the direction of movement of the machine can be controlled is an automatic lathe.

The invention provides, apparatus for controlling a machine of the kind referred to above to cause the machine or part thereof to execute predetermined movements defined by at least one continuous or interrupted line marked on a background having a different reflectivity to that of the line, which apparatus comprises means for illuminating the line, a light-sensitive device for receiving light reflected from the line and providing an output indicative of the position of the device in a direction transverse to the length of the line, which device is connected to the machine or part thereof so that any deviation of the machine or part thereof from its predetermined movements causes relative movement of the device transversely to the line, means for moving the device relatively along the length of the line and means for actuation from the output from the light-sensitive device and for controlling the direction of movement of the machine or part thereof.

Preferably the light-sensitive device is also for receiving light reflected from limited background areas on opposite sides of the line whereby the intensity of the light received by the light-sensitive device varies with changes of position of that device transversely to the line.

Preferably the means for illuminating the line comprises a light source providing a periodically varying light output whereby the light-sensitive device provides a periodically varying output.

Preferably the direction-control-means comprise means for sampling the peak values of the varying output of the light-sensitive device and for providing an output having a magnitude dependent on the amplitude of the peak values of the output of the light-sensitive device.

Preferably the direction-control-means further comprises means for comparing the phase of the varying output of the light-sensitive device with the phase of a periodically varying reference signal and for determining the sign (i.e. positive or negative) of the output of the sampling means in accordance with the phase relationship between the output of the light-sensitive device and the reference signal.

Preferably the direction-control-means further comprises a servo mechanism actuated by the output from the sampling means and for causing changes in the direction of movement of the machine or part thereof.

Preferably the apparatus further comprises means for illuminating the background at a position spaced from or alongside the line, a second light-sensitive device for receiving light reflected from the background and providing an output indicative of the reflecvtivity of the background, means for comparing the output of the second light sensitive device with an output indicative of the reflectivity of the line and means for actuation by the output of the comparison means and for selecting the phase of the aforesaid reference signal.

Preferably the output indicative of the reflectivity of the line is derived from the first said light-sensitive device.

Preferably the output of the light source illuminating the line is caused to vary in a second periodically varying manner intermediate, and preferably 90 degrees out of phase with, the first said periodical variation in the output thereof, thereby to cause the output of the first light-sensitive device to vary in a second periodically varying manner, and the means for illuminating the background comprise a second light source providing a periodically varying light output, whereby the second light-sensitive device provides a periodically varying output, the arrangement being such that the periodic variations in the output of the second light-sensitive device are 180 degrees out of phase with the second periodic variations in the output of the first light-sensitive device.

Preferably the reference-signal-phase-selection means comprise means for sampling the peak values of the output of the reflectivity-comparing-means and for providing an output having a magnitude dependent on the amplitude of the peak values of the output of the reflectivity-comparing-means.

Preferably the reference-signal-phase-selection-means further comprise means for comparing the phase of the output of the reflectivity-comparing-means with the phase of a second reference signal and for determining the sign (i.e. positive or negative) of the output of the reference-signal-phase selection means in accordance with the phase relationship between the output of the reflectivity-comparing-means and the second reference signal.

Preferably the reference-signal-phase-selection-means further comprise switch means actuated by the ouput of the reference-signal sampling means and for selecting the phase of the first said reference signal.

Preferably the apparatus further comprises means for controlling the condition (e.g. stop, start, slow, reverse) of movement of the machine or part thereof, and actuation means for those control means.

Preferably the actuation means comprise means for illuminating markings at the side of the line and one or more additional light-sensitive devices for receiving light reflected from the marking and each having an output which varies when reflected light is received thereby, the output of the or each additional light-sensitive-device being fed to the condition-control-means.

Preferably the apparatus further comprises means for operating the direction-control-means independently of the output of the first said light sensitive device and actuation means therefor, whereby the direction control from the first light-sensitive-device can be overridden.

Preferably the over-riding actuating means comprise means for illuminating further markings at the side of the line, one or more further light-sensitive devices for receiving light reflected from the further markings and each having an output which varies when reflected light is received thereby, and switch means controlled by the output of the or each further light-sensitive device and for selectively actuating the direction-control-means.

Two specific constructions of apparatus embodying the invention will now be described by way of example with reference to the accompanying drawings, in which:

FIGURE 1 is a circuit diagram of the first construction,

FIGURE 2 is a circuit diagram of the relay circuits,

FIGURES 3, 4 and 5 are circuit diagrams of the relay contacts.

Figure 7:
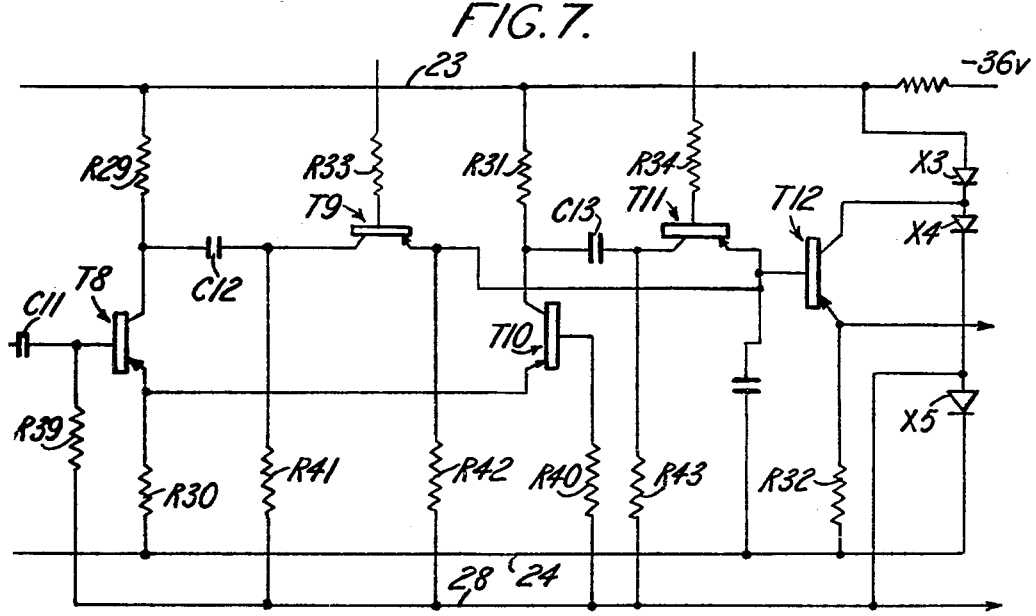

FIGURES 6, 7, 8, 9, 10, 11 and 12 are respectively circuit diagrams of the various electrical components shown in FIGURE 1, FIGURE 13 is a diagram illustrating a junction of three route lines, FIGURES 14 and 15 are respectively a block diagram and a circuit diagram of route selection apparatus, FIGURE 16 is a circuit diagram of the second construction, and FIGURE 17 is a diagram illustrating a route line for the second construction.

In the first example the apparatus is for automatically guiding a steerable vehicle (e.g. a truck) along a predetermined route defined by lines marked on the ground.

The apparatus comprises a search head mounted on a track at the front of the vehicle for movement laterally across the vehicle under the control of an electric motor M1. The search head carries a potentiometer tapping arm arranged to contact a linear potentiometer VR1 extending across the vehicle parallel to the track and energised from a battery. Consequently the potential tapped by the tapping arm is a measure of the position of the search head across the truck. The voltage tapped by the arm is fed as a first control voltage to a power amplifier A8 arranged to energise a motor M2 which acts, through suitable gearing, to steer the vehicle. When the steering mechanism is operated in response to energisation of the steering motor M2, a tapping arm arranged to contact a second potentiometer VR2, also energised from the battery, is moved from its central position and a second control voltage is fed into the amplifier A8. The second control voltage tends to balance the first control or error voltage. When the tapping arms are symmetrically positioned in the length of the respective potentiometers, the motor M2 is de-energised.

The search head comprises two light sources LP1, LP2 arranged to project two patches of light onto the ground beneath the search head, and a photo-electric cell PC2 arranged to "see" both the patches of light and thus to receive the light reflected from the ground. The photo-electric cell PC2 is shielded from receiving light directly from the light sources LP1, LP2. In this example each of the light sources comprises two lamps and an optical system to produce two parallel rectangular beams of light in side by side relationship. Thus, the two patches of light in this example are rectangular in shape and contact one another as can be seen from FIGURE 13. The use of parallel beams of light has the advantage that variations in the vertical separation between the light sources and the ground do not affect the size of the light patches.

The two light sources LP1, LP2 are energised from a master oscillator arranged to produce four sinusoidal output signals with a 90 degree phase difference between them. In FIGURE 1 the signal outputs are labelled 0, 90, 270 and 180. The light source LP1 is energised from the signal having a 90 degree phase angle through an amplifier A1 and the light source LP2 is energised from the signal having a 270 degree phase angle through an amplifier A2. Consequently the two light sources LP1, LP2 are energised 180 degrees out of phase with one another.

Consider now that the rectangular light patches fall symmetrically upon the line as shown by the dashed rectangle 1 in FIGURE 11 and that the reflectivity of the line and background are each uniform. Under these conditions the photo-electric cell PC2 will receive equal amounts of reflected light from both the light sources LP1, LP2 and the intensity of illumination falling on the photo-electric cell PC2 will remain constant. Thus, the reflected intensity falling on the photo-electric cell PC2 due to light source LP1 will be equal to a constant value plus a sinusoidally varying value and that due to light source LP2 will be equal to a constant value minus a sinusoidally varying value since the two light sources are energised 180 degrees out of phase. The output of the photo-electric cell PC2 will therefore be constant under these conditions since the fluctuations in the intensity of the light sources vary in a push-pull manner.

Even if the reflectivity of the line or background is not uniform, when the net reflectivity of the areas on which the patches of light fall are equal, there will be a constant output from the photo-electric cell PC2.

In practice it is found that where filament lamps are used as light sources, the output from the photo-electric cell PC2 is not exactly uniform since the light output of a filament lamp is not entirely linearly related to the current input to the lamp and some distortion takes place which gives rise to harmonies in the output of the photo-electric cell PC2. However, the level of these harmonies can be kept very low by energising the lamps at a sufficiently high frequency. It is found that a frequency of 160 cycles per second is suitable and in this example the lamps are modulated at that frequency to render it substantially independent of normal ambient lighting conditions.

Consider now that the vehicle moves for some reason relative to the line so that the two rectangular patches of light are displaced and no longer fall symmetrically upon the line and background. Under these conditions one of the patches of light will fall on an area of ground having a greater net reflectively than the area of ground upon which the other patch of light falls. A greater intensity of light will therefore be reflected from the area having the greater net reflectively into the photo-electric cell PC2 than will be reflected from the other area. Consequently the photo-electric cell PC2 will receive light at a greater intensity from one of the light sources LP1, LP2 than from the other.

Under these conditions the sinusoidally varying intensity components of the light emitted from the light sources LP1, LP2 will no longer compensate for, or cancel out, each other and there will therefore be a varying intensity of illumination falling on the photo-electric cell PC2. Consequently the photo-electric cell will produce a modulated output or error signal, the amplitude of which will be indicative of the extent or magnitude of the displacement and the phase of which will correspond to the phase of the light source falling on the area having the greater net reflectivity. The amplitude of the error signal will therefore provide information as to the extent or magnitude of the displacement and the phase of the error signal will therefore provide information as to which direction the vehicle has to be steered to restore the condition in which the two patches of light fall symmetrically on the line and background. The photo-electrical cell PC2 provides a light-sensitive device providing an output indicative of the position of the device in a direction transverse to the length of the line. The phase of the error signal can be found by comparison with a synchronising or reference frequency.

In the case of rectangular light patches and a straight edged line, the amplitude of the error signal will be directly proportional to the displacement or deviation from the position in which the two light patches fall symmetrically on the line and background.

The output signal from the photo-electric cell PC2 is employed to control energisation of the motor M1 for moving the search head across the vehicle and thus to control energisation of the steering motor M2. For this purpose the output signal from the photo-electric cell PC2 is passed through a resistor R1 to an amplifier A3 and the amplified signal is fed to a phase sensitive detector PSR1. The phase sensitive detector PSR1 is controlled or synchronised from the master oscillator signals having 0 and 180 degree angles through relay contacts RLB1, RLB2, or relay contacts RLC1, RLC2 (FIGURE 3), the phase of the reference signal being changed by 180 degrees on reversal of the relay contacts. The synchronising signal taken from the master oscillator is compared in phase with the error signal to provide information as to which way the vehicle is to be steered, and the reference signal is used to switch the phase sensitive detector PSR1 between a detecting condition and a non-detecting condition. The phase relationship between the synchronising signal and the error signal is arranged to be such that the phase sensitive detector is in a detecting condition for short intervals on either side of the peak values of the error signal and is in a non-detecting condition between those intervals. The synchronising signal is 90 degrees out of phase with the signals energising the light sources LP1, LP2, since the light output from those sources lags the energising signals applied thereto by about 90 degrees. The phase sensitive detector PSR1 is thus in a detecting condition for intervals in phase with the peak light output of the light sources LP1, LP2.

The phase sensitive detector PSR1 provides a D.C. output signal, the magnitude of which is proportional to the peak values of the error signal, which D.C. output signal is filtered to remove the modulation frequency. The filtered output signal of the phase sensitive detector PSR1 is of a polarity or sign depending upon whether the error signal lags or leads the reference signal which, in turn, is dependent upon the direction in which the light patches, and consequently the search head, have been displaced, and on the sign of contrast between the line and the background, that is whether the line has a greater or less reflectively than the background. The magnitude of the filtered output signal is dependent on the extent of the displacement of the light patches from their symmetrical positions and on the difference between the reflectivity of the line and background.

The filtered output signal is fed to a power amplifier A7 arranged to energise the search head traction motor M1. When the motor M1 is energised, the search head is moved in a direction tending to return the search head to a position in which the two light patches fall symmetrically on the line and background. As the search head is moved across the truck in accordance with the energisation of the motor M1, the tapping arm is moved along the length of the potentiometer VR1 thereby varying the first control voltage fed to the power amplifier A8. Consequently, the steering motor M2 is energised and the wheels of the vehicle turned in a direction to correct for the movement of the truck relative to the line which caused the light patches to be displaced relative to the line and no longer to fall symmetrically upon the line and background.

Thus, the motor M1 acts in a manner to move the search head to a position in which the light patches fall symmetrically upon the line and background and the motor M2 acts in a manner to move the vehicle to a position in which the tapping arms are symmetrically positioned in the lengths of their respective potentiometer, that is to a position of the vehicle in which the search head is positioned centrally in the length of its travel. The stable position of the apparatus therefore corresponds to a condition in which the search head is positioned centrally in the length of its travel and the light patches fall symmetrically on the line and background.

The basic control system for the motor M1 described above forms a closed loop and for the system to be stable the conditions for stability must be satisfied. Further, the motor M1 is of a permanent magnet type motor and hence the control system is a first order system. The control system would therefore be stable for all values of gain of the amplifier A3 if that were the only component in the system which introduced a phase lag. However, the phase sensitive detector PSR1 also introduces a phase lag and it is therefore necessary for the gain of the amplifier A3 to be held constant within reasonable limits.

Now the gain of the amplifier A3 may vary for a number of reasons but the factor causing the largest variation will be the amplitude of the signal fed into it. This, in turn, will be dependent on the contrast between the line and the background, that is on the difference between the reflectivity of the line and reflectivity of the background. Consequently a signal indicative of the contrast between the line and the background can be used to control the gain of the amplifier A3. Such a signal can be produced by obtaining a first component signal indicative of the net reflectivity R of the line and background and subtracting it from a second component signal indicative of the reflectivity R of the background alone, that is:

$$R_{line+background} - 2R_{background} = R_{line-background}$$

This quantity, the reflectivity of the line minus the reflectivity of the background, is a measure of the contrast of the line and background and is of a sign dependent on whether the line or background has the higher reflectivity.

The first of these component signals may conveniently be obtained from the photo-electric cell PC2 and for this purpose an in-phase additional modulation is impressed on each of the light sources LP1, LP2 with a phase difference of 90 degrees from the primary or push-pull modulations impressed on those two light sources. The additional modulation is thus in quadrature to the push-pull modulations. This additional modulation has no effect on the filtered output signal obtained from the phase sensitive detector PSR1 since that detector is only responsive to the peak values of the signal fed to it.

The additional modulation is obtained by energising the light sources LP1, LP2 from the master oscillator signal having a 0 degree phase angle through an amplifier A5. The resulting additional modulations of the intensity of the two light patches affect the intensity of light received by the photo-electric cell PC2 and consequently the output of that cell will contain a signal indicative of the net reflectivity of the line and background.

The second component signal is obtained from a second photo-electric cell PC3 mounted in a background head carried at the front of the vehicle. The background head comprises a light source LP3 arranged to project a patch of light onto the ground beneath the background head and the photo-electric cell PC3 is arranged to "see" this patch of light and thus to receive light reflected from the ground. The photo-electric cell PC3 is shielded from receiving light directly from the light source LP3. The background head is positioned on the vehicle so that the patch of light from light source LP3 falls only on the background and consequently the output of the photo-electric cell PC3 will contain a signal indicative of the reflectivity of the background.

The light source LP3 is energised from the master oscillator signal having a 180 degree phase angle through an amplifier A4 and the modulations of the light source LP3 are thus 180 degrees out of phase with the additional modulations of the light sources LP1, LP2. Consequently the two component signals obtained from photo-electric cells PC2, PC3 will be 180 degrees out of phase. These two component signals are mixed through resistors R1, R2, the value of R2 being twice that of R1, to provide a contrast signal. When the patches of light from light source LP1, LP2 and LP3 all fall on background, the mixed signal is zero since the component signals are equal and opposite in phase.

The signal fed to the amplifier A3 comprises both the error signal and the contrast signal, and the output of the amplifier A3 is also fed to a second phase sensitive detector PSR2. The phase sensitive detector PSR2 is controlled or synchronized from the master oscillator signals having 90 and 270 degree phase angles through relay contacts RLB3, RLB4 or relay contacts RLC3, RLC4 (FIGURE 4) the phase of the reference signal being changed by 180 degrees on several of the relay contacts. Again the synchronising signal taken from the master oscillator is used to switch the phase sensitive detector PSR2 between a detecting condition and a non-detecting condition and the phase relationship between the synchronising signal and the contrast signal is arranged to be such that the phase sensitive detector PSR2 is in a detecting condition for short intervals on either side of the peak values of the contrast signal and is in a non-detecting condition between those intervals. Again the synchronising signal is 90 degrees out of phase with the appropriate signals energising the light sources LP1, LP2 and LP3 since the light output from those sources lags the energising signals applied thereto by about 90 degrees. The two phase sensitive detectors PSR1, PSR2 are therefore in detecting conditions 90 degrees out of phase with each other and consequently the detector PSR1 is responsive only to the error signal and the detector PSR2 is responsive only to the contrast signal.

The phase sensitive detector PSR2 provides a D.C. output signal, the amplitude of which is proportional to the peak values of the contrast signal, which D.C. signal is filtered to remove the modulation frequency. The filtered output from the phase sensitive detector PSR2 is fed, through a voltage delay 1, back to the amplifier A3 as a gain-control-voltage and acts to reduce to the gain of amplifier A3. The voltage delay 1 is included so that the gain of the amplifier A3 is only changed when the output signal of the detector PSR2 exceeds a predetermined value. The signal comprising both the error signal and the contrast signal is also fed to an amplifier A6 of fixed gain. The output of the amplifier A6 is fed to a third phase sensitive detector PSR3. The phase sensitive detector PSR3 is controlled or synchronised from the master oscillator signals having 90 and 270 degree phase angles, the connections being made directly to the master oscillator. Again the synchronising signal is used to switch the phase sensitive detector PSR3 between a detecting condition and a non-detecting condition and the phase relationship between the synchronising sigal and the contrast signal is arranged to be such that the phase sensitive detector PSR3 is in a detecting condition for short intervals on either side of the peak values of the contrast signal and is in a non-detecting condition between those intervals.

The phase sensitive detector PSR3 provides a D.C. output signal, the amplitude of which is proportional to the peak value of the contrast signal and the sign or polarity of which is dependent on whether the contrast signal lags or leads the reference signal, which in turn depends on the sign of contrast between the line and the background. Thus, if the line has a higher reflectivity than the background the D.C. output signal of the detector PSR3 will be of one sign, say positive, and if the line has a lower reflectivity than the background the D.C. output signal will be of the opposite sign, that is to say negative.

The D.C. output signal of the detector PSR3 is fed to a polarised relay RLA through a voltage delay 2 which prevents operation of the relay RLA unless the signal exceeds a predetermined magnitude. The current fed to the relay RLA is dependent on the contrast between the reflectivity of the line and the background and the control system is arranged so that when the contrast is below a minimum value the relay RLA is not operated and consequently the control system is maintained inoperative.

For this purpose the polarised relay RLA comprises a centre stable contact arm RLA1 (FIGURE 2) which is moveable on energisation of the relay RLA to a position in which relay RLB is energised or to a position in which relay RLC is energised. Which position the contact arm takes up is determined by the sign of the output signal of the detector PSR3 and consequently by the contract between the line and background.

The relay RLB controls the relay contacts RLB1, RLB2, RLB3, RLB4 (FIGURES 3 and 4) and the relay RLC controls the relay contacts RLC1, RLC2, RLC3, RLC4.

The phase of the reference signals applied to the phase sensitive detectors PSR1, PSR2 is therefore determined by which of the relays RLB or RLC is energised and the arrangement is such that the phase of the reference signal applied to the detector PSR2 is always such that when a signal is fed back to the amplifier A3, the fed back signal always tends to reduce the gain of that amplifier.

The relay RLB, RLC also respectively control relay contacts RLB5, RLB6 and RLC5, RLC6 (FIGURES 2 and 5). Relay contacts RLB5, RLC5 are connected in parallel and when either the relay RLB or RLC is energised the appropriate relay contact RLB5 or RLC5 is moved to a position in which an energising voltage is applied to a relay RLD controlling relay contacts RLD1, RLD2, RLD3 (FIGURES 1 and 3). The relay contact RLD1 is normally in a position in which the detector PSR1 is connected to a double relay contact RLE2 (FIGURE 3) of a relay RLE (FIGURE 2) but as soon as a contrast signal is obtained having a sufficient amplitude to operate relay RLB or RLC the contact RLD1 will be moved to its alternative position in which the error signal is fed to the phase sensitive detector PSR1. The contacts RLD2, RLD3 are normally closed to supply a reference signal of a predetermined phase to the phase sensitive detector PSR1 but when the relay RLD is energised those contacts are opened and the signal fed to detector PSR1 therethrough interrupted.

Two micro-switches S1, S2, (FIGURE 2) are positioned at the ends of the track along which the search head moves and are respectively arranged for actuation by the search head when it reaches the appropriate end of its travel. The micro-switch S1 is normally open and the micro-switch S2 is normally closed. The relay RLE is connected between a line inter-connecting the two micro-switches and including a relay contact RLE1, and a positive supply line as shown in FIGURE 2 and is arranged to be energised when the micro-switch S1 is operated. The relay contact RLE2 of the relay RLE normally takes up a position, as shown in FIGURE 2, in which a signal having a 180 degree phase angle is fed to the detector PSR1 when the relay RLD is de-energised. However, when the relay RLE is energised the relay contact RLE2 is changed over to a position in which a signal having a 0 degree phase angle is fed to the detector PSR1.

The arrangement is such that when both the relays RLD and RLE are de-energised the phase of the signal fed to the phase-sensitive-detector PSR1 and consequently the sign of the signal fed to the motor M1, is such as to move the search towards the normally open micro-switch S1. When that switch is operated the relay RLE is energised causing the relay contact RLE1 to close and the relay contact RLE2 to change over to its alternative position. When the relay contact RLE2 is changed over, the phase of the signal fed to the detector PSR1 is reversed and the signal fed to the motor M1 consequently drives it in the opposite direction. The search head is therefore moved away from the micro-switch S1 the contact of which opens. However, the energising circuit of the relay RLE2 is maintained through the relay contact RLE1 which is arranged to be self-holding.

The head therefore continues its travel towards the micro-switch S2 until that switch is operated. When the contacts of switch S2 are opened the energising circuit of relay RLE is broken causing the contact RLE2 to revert to the position in which the 180 degree signal is fed to the detector PSR1 and the search head moved towards the micro-switch S1. Simultaneously the contact RLE1 drops out.

If in the whole of its travel the search head does not scan a line, the reciprocating movement of the search head will continue indefinitely. However, if a line is scanned, a contrast signal will be fed to the polarised relay RLA causing the appropriate relay RLB or RLC to be energised thus closing the relay contacts RLB5 or RLC6. When one or other of those contacts is closed, the relay RLD will be energised causing the relay contact RLD1 to be changed over to its position in which the error signal is fed to the detector PSR1 and in which any signal to detector PSR1 through the contact RLE2 is prevented. Automatic traversing of the search head in this manner is useful both for initially positioning the vehicle on the line or for re-positioning the vehicle on the line should the line become lost.

If the foregoing system for producing a contrast signal is to operate satisfactorily within required limits, it is desirable to stabilize the intensity of the light sources. For this purpose a second photo-electric cell PC1 is mounted in the search head and is arranged to receive light directly from the light sources LP1, LP2. Since the push-pull modulations of the light sources LP1, LP2 are 180 degrees out of phase, the primary modulation in the intensity of light falling on photo-electric cell PC1 will be due to the additional modulations impressed on the light sources LP1, LP2. The photo-electric cell PC1 will therefore provide a varying output lagging 90 degrees on the energising currents supplied to the light sources LP1, LP2 through amplifier A5. This output signal is fed to a phase advancing network N1, which advance the phase of the signal by 90 degrees, and from the network N1 to the amplifier A5 where it is imposed on the 0 degree signal fed to that amplifier from the master oscillator. The signal fed back into the amplifier A5 is thus 180 degrees out of phase with the signal obtained from the master oscillator and the difference between the two signals tends to maintain the net input to the amplifier A5, and consequently the output thereof, constant. The photo-electric cell PC1 and the network N1 provides a negative feed-back loop.

A further photo-electric cell PC4 is mounted in the background head and is arranged to receive light directly from the light source LP3. The photo-electric cell PC4 provides a varying output which is fed back into the amplifier A4 and which tends to maintain the output of that amplifier constant. A phase advancing network may be included in the feed-back loop but is not essential.

The detailed construction of the foregoing electrical components will now be described.

The circuit of the amplifier A3 is shown in FIGURE 6. The input signal is fed to the base of a first transistor T1, the collector of which is connected to a line 21 held at minus 15 volts through a resistor R6 and the emitter is connected to a line 22. An amplified signal is taken from the collector of transistor T1 and is applied to the base of a second transistor T2. The collector of transistor T2 is connected to line 21 through a resistor R7 and the emitter of that transistor is connected to the line 22 through a parallel circuit comprising resistors R8, R9 and capacitor C5. The base of transistor T1 is connected to resistor R9 through a resistor R10 as shown. An amplified signal is taken from the collector of transistor T2 and applied to an attenuating network 23 through a capacitor C6. Network 23 comprises resistors R11, R12, R13, R14, R15, rectifiers X1 and X2 and capacitors C7, C8 connected as shown. A control signal is fed to the junction of the resistors R11 and R13 from the collector of a transistor T3 and also a signal is fed to the junction between resistors R12 and R15 from the collector of a transistor T4. The emitters of transistors T3, T4 are strapped together and connected to the line 22 through a resistor R18, and the collectors of transistors T3, T4 are connected to the line 21 through resistors R19, R20 of equal value. The base signal for the transistor T3 is taken from a potential divider comprising resistors R16 and R17 and the base signal for the transistor T4 is derived from the automatic gain control phase sensitive detector PSR2.

The output signal from the network 23 is taken from the junction between resistor R14 and rectifiers X1 and X2 and is applied to the base transistor T5. The collector of transistor T5 is connected to the line 23 through resistor R21 and the emitter of that transistor is connected to the line 22 through resistor R22. An amplified output signal is taken from the emitter of transistor T5 and fed through a capacitor C9 and a resistor R23 to the base of a transistor T6. The emitter of transistor T6 is connected directly to the line 22 and the collector is connected to the line 21 through resistor R24. An amplified signal is taken from the collector of transistor T6 and fed directly to the base of a transistor T7, the collector of which is connected to the line 21 through resistor R25 and the emitter of which is connected to the line 22 through a parallel circuit comprising resistors R26, R27 and capacitor C10. The base of transistor T6 is connected to the resistor R26 through a resistor R28. The amplified output signal of the amplifier A3 is taken from the collector of transistor T7 and fed to the phase sensitive rectifier PSR1.

The circuit of the phase sensitive detector PSR1 is shown in FIGURE 7. The amplified output from the amplifier A3 is fed to the base of a transistor T8 through a capacitor C11. The emitter of transistor T8 is connected to the emitter of a transistor T10, so that those emitters are held at the same potential. The collectors of transistors T8, T10 are connected to a line 23 held at minus 36 volts through resistors R29, R31 and the emitters of those transistors are connected to the line 24 through resistor R30. The collectors of transistors T8, T10 are respectively connected to the emitters of transistors T9, T11 through capacitors C12, C13. The emitters of transistors T9, T11 are connected together and to the base of a further transistor T12.

Figure 8:
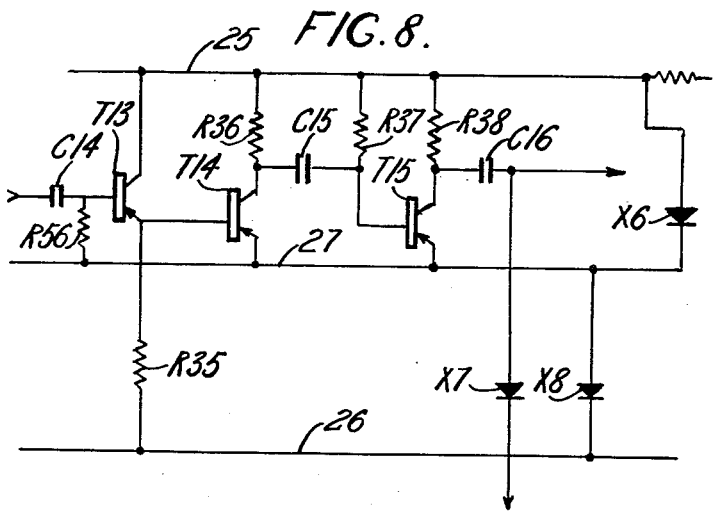
Figure 9:
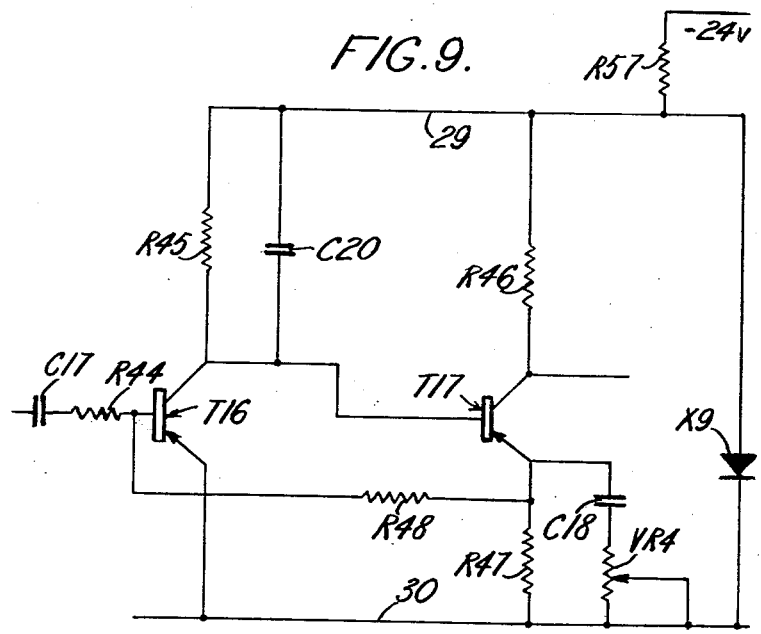

The phase sensitive rectifier PSR1 includes a pulse shaper circuit which is shown separately in FIGURE 8. The collector of transistor T13 is connected to a line 25 and the emitter of that transistor is connected to a line 26 through a resistor R35. The base of transistor T13 is connected through a resistor R56 to a line 27 which is connected through a zener diode X6 to the line 25. A signal is taken from the emitter of transistor T13 and fed to the base of a transistor T14, the collector of which is connected to the line 25 through a resistor R36 and the emitter of which is connected directly to the line 27. An output is taken from the collector of the transistor T14 and is applied, through a capacitor C15 to the base of a transistor T15. The base of transistor T15 is also connected to the line 25 through a resistor R37. The collector of the transistor T15 is connected to the line 25 through resistor R38 and the emitter of that transistor is connected directly to the line 27. A first output signal is taken from the collector of transistor T15 through a capacitor C16 and a rectifier X7 and fed to the bases of transistor T9 (FIGURE 7) through resistor R33. A second signal is also taken from a further pulse unit via R34 to the base of transistor T11.

Referring to FIGURE 7, the emitter of transistor T12 is connected to the line 24 through resistor R32 and the collector of that transistor is connected to the junction between two zener diodes X3, X4 which are connected in series with a further zener diode X5 between the line 23 and 24. The output from the phase sensitive detector PSR1 is taken from the emitter of transistor T12 and fed to the amplifier A7.

The circuits of the phase sensitive detectors PSR2, PSR3 are substantially the same as the circuit of detectors PSR1 and will therefore not be described.

Figure 10:
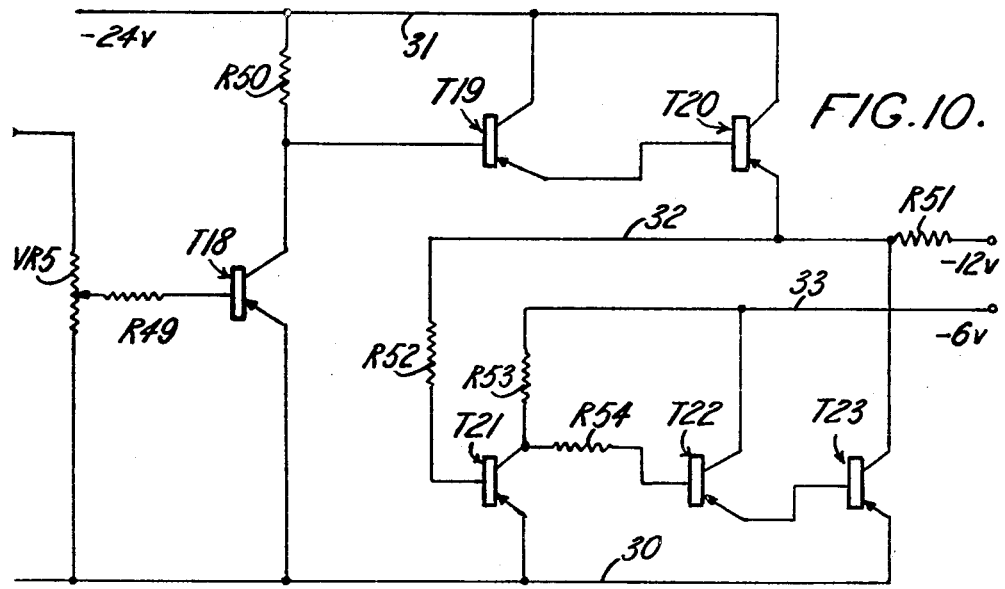

The circuit of the D.C. amplifier A7 is similar to amplifier A8 (FIGURE 10).

The circuit of the amplifier A8 is shown in FIGURE 10. The signal derived from the potentiometer VR1 is passed to the common line 30 through a potentiometer VR5. The signal derived from the tapping of the potentiometer VR5 is fed through a resistor R49 to the base of a transistor T18. The collector of transistor T18 is connected through a resistor R50 to a line 31 held at minus 36 volts and the emitter of that transistor is connected directly to the line 30. An amplified output signal is taken from the collector of transistor T18 and applied to the base of a transistor T19. The collector of the transistor T19 is connected directly to the line 31 and the emitter of that transistor is connected to the base of a transistor T20, the collector of which is connected directly to the line 31. The emitter of transistor T20 is connected to a line 32 which is connected to a steady source of potential at minus 18 volts through a motor and to the base of a transistor T21 through a resistor R52. The collector of transistor T21 is connected to a line 33 held at minus 6 volts through a resistor R53 and is connected to the base of a transistor T22 through a resistor R54. The emitter of transistor T21 is connected directly to the line 30 and the collector of the transistor T22 is connected directly to the line 43. The emitter of transistor T22 is connected directly to the base of a transistor T23. The collector of the transistor T23 is connected directly to the line 22 and the emitter of that transistor is connected directly to the line 30.

In the foregoing example the various electrical components have the following values:

The lamp regulator circuit is shown in FIGURE 11. The two lamps LP1, LP2 are connected in a parallel circuit comprising two switches S11, S12 and the parallel circuit is connected between a line 41 held at minus 24 volts and a line 42 through a transistor T24. The emitter of transistor T24 is connected to the line 42 through a resistor R63 and a parallel circuit comprising zener diodes X10, X11, resistor R64 and capacitor C24. The transistor T24 acts to regulate the current supplied to the lamps.

Signals are fed respectively to the base of a transistor T25 through capacitors C20, C21 and resistors R57, R58 as shown. The collector of transistor T25 is connected to the line 41 through resistor R59 and the emitter of that transistor is directly connected to the line 42. An output is taken from the collector of transistor T25 and fed to the base of a transistor T26, the collector of which is connected to the line 41 through resistor R60 and the emitter of which is connected to the line 42 through a parallel circuit comprising resistor R61, capacitor C22 and potentiometer VR6. The emitter of transistor T26 is connected to the base of transistor T25 through resistor R62.

An output signal is taken from the collector of transistor T26 and fed to the base of a transistor T27 through a capacitor C23. The collector of transistor T27 is connected to line 41 through resistor R62 and a control voltage is taken from the emitter of that transistor and fed to the base of transistor T24. The base of transistor T27 is connected through resistor R65 to the junction of resistor R64 and zener diode X11. A resistor R66 is connected in the line 41 and a zener diode X12 is connected between the line 41 as shown.

The regulator circuit further comprises a transistor T28, the base of which is connected to the junction of two resistors R67, R68 connected between the line 42 and a line 43 held at minus 6 volts. An output is taken from the collector of transistor T28 which is connected to the line 43 through a parallel circuit comprising resistors R69, R70, and capacitor C25. The collector is further connected to the line 42 through a resistor R71. The emitter of transistor T28 is connected to the line 42 through resistor R72 and a parallel circuit comprising resistor R72 and capacitor C26.

The basic oscillator circuit is shown in FIGURE 12. Four transistors T29, T30, T31, T32 are connected between line 44 and common line 45 through resistors R73, R74, R75, R76, R77, R78 and R79 as shown and those lines are connected through zener diode X13. A signal is fed back to the base of transistor T31 from the collector of transistor T32 through resistor R80 and a signal is similarly fed back to the base of transistor T33 from the emitter of transistor T34 through resistor R81. The base of transistor T33 is connected to the line 44 through a resistor R82 and that line is connected to a source of minus 24 volts through a resistor R83.

A signal is taken from the collector of transistor T31 and fed to the base of transistor T32. The collector and emitter of transistor T32 are connected together through a series circuit comprising resistor R84 and capacitor C27 and the junction of those components is connected through a further series circuit comprising resister R85 and capacitor C28 to the base of transistor T33. A signal is taken from the base of transistor T33 and fed to the base of transistor T34. The collector and emitter of transistor T34 are connected together through a series circuit comprising resistor R86 and capacitor C29 and a signal is fed back to the base of transistor T31 from the junction of resistor R86, and capacitor C29 through a series circuit comprising resistor R87 and capacitor C30.

Resistors:

| | | |
|---|---|---|
| R7 | kilohms | 4.7 |
| R8 | do | 4.7 |
| R10 | do | 120 |
| R11 | do | 10 |
| R12 | do | 10 |
| R13 | do | 33 |
| R14 | do | 6.8 |
| R15 | do | 33 |
| R16 | do | 15 |
| R17 | do | 2.2 |
| R18 | ohms | 680 |
| R19 | kilohms | 4.7 |
| R20 | do | 4.7 |
| R21 | do | 1 |
| R22 | do | 4.7 |
| R23 | do | 6.7 |
| R24 | do | 10 |
| R25 | do | 4.7 |
| R26 | do | 4.7 |
| R28 | do | 120 |
| R29 | do | 1 |
| R30 | do | 2.2 |
| R31 | do | 1 |
| R32 | do | 1 |
| R33 | do | 180 |
| R34 | do | 180 |
| R35 | do | 10 |
| R36 | do | 10 |
| R36 | do | 2.2 |
| R37 | do | 47 |
| R38 | do | 2.2 |
| R39 | do | 2.2 |
| R40 | do | 1 |
| R41 | do | 3.3 |
| R42 | do | 10 |
| R43 | do | 3.3 |
| R44 | do | 4.7 |
| R45 | do | 10 |
| R46 | do | 4.7 |
| R47 | do | 4.7 |
| R48 | do | 100 |
| R49 | do | 10 |
| R50 | do | 1.4 |
| R51 | ohms | 25 |
| R52 | kilohms | 130 |
| R53 | do | 2.2 |
| R54 | do | 30 |
| R57 | do | 4.7 |
| R58 | do | 4.7 |
| R59 | do | 10 |
| R60 | do | 4.7 |
| R61 | do | 4.7 |
| R62 | do | 2.2 |
| R64 | do | 1.5 |
| R65 | do | 5.6 |
| R66 | ohms | 200 |

Resistors:

| | | |
|---|---|---|
| R67 | kilohms | 3.9 |
| R68 | do | 6.8 |
| R69 | do | 3.9 |
| R70 | ohms | 330 |
| R71 | kilohms | 8.2 |
| R72 | ohms | 330 |
| R72a | kilohms | 3.9 |
| R73 | do | 10 |
| R74 | do | 1 |
| R75 | do | 4.7 |
| R76 | do | 4.7 |
| R77 | ohms | 820 |
| R78 | kilohms | 4.7 |
| R79 | do | 4.7 |
| R80 | do | 150 |
| R81 | do | 560 |
| R82 | do | 470 |
| R83 | do | 1 |
| R84 | do | 10 |
| R85 | do | 47 |
| R86 | do | 10 |
| R87 | do | 47 |

Capacitors:

| | | |
|---|---|---|
| C1 | | |
| C2 | microfarads | 5.50 |
| C6 | do | 8 |
| C7 | do | 8 |
| C8 | do | 8 |
| C9 | do | 8 |
| C10 | do | 50 |
| C12 | do | 8 |
| C15 | do | 0.005 |
| C16 | do | 2 |
| C17 | do | 500 |
| C18 | do | 25 |
| C19 | do | 0.04 |
| C20 | do | 0.1 |
| C21 | do | 0.1 |
| C22 | do | 35 |
| C23 | do | 25 |
| C24 | do | 50 |
| C25 | do | 0.25 |
| C26 | do | 45 |
| C27 | do | 0.1 |
| C28 | do | 50 |
| C29 | do | 0.1 |
| C30 | do | 50 |

Transistors:

| | |
|---|---|
| T1 | O.C. 45 |
| T2 | O.C. 75 |
| T3 | O.C. 71 |
| T4 | O.C. 71 |
| T5 | O.C. 71 |
| T6 | O.C. 45 |
| T7 | O.C. 75 |
| T8 | O.C. 72 |
| T9 | O.C. 71 |
| T10 | O.C. 72 |
| T11 | O.C. 71 |
| T12 | O.C. 71 |
| T13 | O.C. 71 |
| T14 | O.C. 71 |
| T15 | O.C. 71 |
| T16 | O.C. 201 |
| T17 | O.C. 75 or O.C. 45 |
| T18 | TR1 V60/30P |
| T19 | TR2 V60/30P |
| T20 | TR5 V60/30P |
| T21 | TR3 O.C. 45 |
| T22 | TR4 O.C. 71 |
| T23 | TR6 V60/30P |
| T24 | V30/20 IP |
| T25 | O.C. 201 |

Transistors:

| | |
|---|---|
| T26 | O.C. 75 |
| T27 | O.C. 71 |
| T28 | O.C.P. 71 |
| T31 | O.C. 45 |
| T32 | O.C. 75 |
| T33 | O.C. 45 |
| T34 | O.C. 75 |

Rectifiers:

| | |
|---|---|
| X1 | OA 81 |
| X2 | OA 81 |
| X3 | Z2 A100 |
| X4 | Z4 A 56 |
| X5 | Z2 A 56 |
| X7 | 56 |
| X8 | 150 |
| X9 | Z2 A 150 F |
| X10 | Z2 A 56 F |
| X11 | Z2 A 56 F |
| X12 | Z2 A150 F |
| X13 | Z2 A150 F |

The apparatus described above enables the vehicle to automatically follow a single line marked on the ground. However, in some circumstances it is necessary for a plurality of vehicles to move over a single main line but to turn off from that line onto other or subsidiary lines at different positions along the length of the main line. Thus, in FIGURE 13 three alternative routes are determined by the lines A, B and C. If the light patches due to light sources LP1, LP2 fall symmetrically on the line A as shown by the rectangle drawn in chain lines in FIGURE 11 and designated 1, then the vehicle will proceed along route A. However, if a signal is given to the vehicle control system to steer the vehicle to a position in which the light patches due to light sources LP1, LP2 are displaced from the line A, as shown by the second rectangle drawn in chain lines in FIGURE 3 and designated 2, then the vehicle will proceed until the light patches fall on the line B and the vehicle is caused automatically to follow route B. Consequently, if the vehicle is to follow route B or C a route-selection signal to this effect must be given to the vehicle control system before it reaches the junction for example at the position X. If no such signal is given the vehicle would merely follow route A.

The route selection signal is fed into the control system through resistor R4 and the control system is brought into a condition to accept the route-selection signal by means of a relay RLF (not shown). The relay RLF is energised when a route-selection signal is to be fed into the control system and when that relay is energised the relay contact RLF1 is moved to a position in which the amplifier A7 is connected to the resistor R4 and the relay contact RLF2 is moved to a position in which the amplifier A8 is connected to the resistor R4 through capacitor C1 and resistor R3. The capacitor C1 acts as a signal memory of the position of the search head. The relay RLF operates a further relay contact RLF3 (FIGURE 2) which is in parallel with the two relay contacts RLB5, RLC5 and consequently the relay RLD is energised. Relay contacts RLD2, RLD3 are therefore moved to positions in which the reference signal from the master oscillator to the detector PSR1 is interrupted.

The route selection signal is amplified by the amplifier A7 and fed to the search head motor M1. The search head is consequently moved along its track and, if the vehicle is to follow route B, the search head is moved until the light patches are displaced to the position 2. As the search head is moved, the contact arm of the potentiometer VR1 is moved and a correcting signal fed to the amplifier A8. However, this signal is balanced by the route-selection-signal fed to that amplifier and the steering motor is not energised.

When the search head has been moved to its appropriate position the relay RLF is de-energised and the contacts RLF1, RLF2 and RLF3 revert to their normal positions.

The foregoing apparatus enables the vehicle to follow a predetermined route but additional or overall control is necessary if the vehicle is to operate as automatically as is convenient or possible. Such overall or condition control may be utilised to stop, slow reverse or start the vehicle and to supply route-selection-signals to the apparatus. Overall control information may be given to the vehicle guidance system in numerous ways, for instance by means of light signals from or reflected from the side of the vehicle route, by means of contrasting marks of a specified pattern on the ground adjacent the route line, or by information stored on the vehicle by means of punched cards, magnetic tapes or other devices for storing information.

However, overall control of the vehicle will be carried out by either of two basic systems, which may conveniently be described as direct or coded control. Direct control can be obtained by switches or push buttons, or by simple photo-electrically operated relays and the circuitry employed in such direct control is relatively simple and consequently will not be described. Coded control is more complex and may employ contrasting patterns to supply overall control information to the vehicle.

A coded system of overall control will now be described which uses a binary scheme of contrasting patterns marked on the ground adjacent the route line. The system can identify or recognize up to seven "points of decision" along a main route and switches on the vehicle give a choice of four control functions at each point of decision, viz., stop, reverse and branch left or right.

The system comprises a scanning or reading head having a light source LP4 energised through an amplifier A9 from the master oscillator and five photo-electric cells PC5, 6, 7, 8 and 9. The light source LP4 is modulated at a convenient frequency, say 160 c.p.s., and comprises an optical system arranged to throw a rectangular patch of light onto the ground of a sufficient size to be "seen" by all the photo-electric cells. The photo-electric cells PC5, 6, 7, 8 and 9 are shielded from receiving light directly from the light source but receive light reflected from the ground. The scan of each of the photo-electric cells is such that they only "see" one fifth of the total area of the light patch projected from the light source.

The outputs of the photo-electric cells PC5, 6, 7, 8 and 9 are respectively fed to associated amplifiers A10, 11, 12, 13 and 14 and the amplified output supplied to detectors D1, D2, D3, D4 and D5. The output of the detectors D1, D3 and D5 are employed to operate relays RLZ, RLX and RLY and the output of the detectors D2, D4 are employed to operate a common relay RLW. The common relay RLW prevents control signals being given by random marks on the ground. The contacts of the relays RLZ, RLX, RLY and RLW are shown in FIGURE 13 in the positions they assume when those relays are energised.

The relays RLY and RLU are connected between a supply return line and a control voltage line by lines 1, 2 and 3. The lines 1, 2 and 3 are interconnected as shown in FIGURE 5 and the lines 1 and 2 include relay contacts RLB6 and RLC6 of relays RLB and RLC. Consequently when a contrast signal of sufficient amplitude is fed to the polarised relay RLA either the relay RLY or the relay RLU is energised. Energisation of the relay RLY causes the relay contacts RLY1, Y2, Y3 and Y4 to be closed and energisation of the relay RLU causes the relay contacts RLU1, U2, U3 and U4 to be closed. Further the contacts RLY1, Y2, Y3 and Y4 are respectively in parallel with the contacts RLU1, U2, U3 and U4 so that circuits can be made to relay contacts RLW1, RLZ1, RLX1 and RLV1 when either of the relays RLY or RLU is energised.

Consider now that the relay RLX is energised and that the background has a higher reflectivity, that is a white background, and the contrasting patterns have a low reflectivity, that is black patterns. When the light patch falls only on the background, each of the photo-electric cells P5, 6, 7, 8 and 9 receives reflected light and the relays RLZ, RLX, RLW, RLY, RLZZ, RLXX and RLVV are all energised and the associated relay contacts are in the position shown in FIGURE 15.

In this condition of the relays the control voltage is not fed to any of the rotors of rotary selector switches S1 to 7, the contact arms of those selectors occupying the stop position.

Consider now that the reading head passes over a pattern on the ground which is such that little or no light is reflected into the photo-electric cells PC5 and PC3. Consequently, relays RLZ and RLX are de-energised and relay contacts RLZ1 and RLX1 are changed over from the positions shown in FIGURE 15. Relays RLZZ and RLXX are therefore de-energised and relay contacts RLZZ1, RLXX1 and RLXX2 also changed over from the positions shown in FIGURE 15. In this condition of the relays the control voltage is channelled to the rotary selector S5 and in this particular example provides a route-selection signal to prepare the vehicle to branch left.

Other combinations of patterns on the ground cause the control voltage to be channelled alternatively to the other rotary selectors.

When the line has a higher reflectivity than the background, that is a white line on a black background, the contrasting patterns will be white. Further under these alternative conditions the relay RLY is energised and not relay RLU.

The patterns on the floor may conveniently comprise lines marked at an angle to the route line and of a length such as only to be "seen" by the appropriate photo-electric cell. If random marks on the floor stimulate a control pattern but are also "seen" by one or other of the photo-electric cells PC6 or PC8 the relay RLW is de-energised or energised depending on the sign of contrast between the route line and the background, and the relay contact RLW1 operated. Such operations of the relay contact RLW1 prevent the control voltage being channelled to the selectors.

The foregoing apparatus is substantially independent of all ambient lighting conditions and also substantially independent of line to background contrast variation.

In the second example the apparatus is for automatically guiding the direction of movement of a part of a machine, for example the co-ordinate table of a milling machine, the router head of a high speed routing machine, the drilling head of a drilling machine or the slide of an automatic lathe. Such parts are movable in two directions mutually perpendicular to each other under the control of two perpendicular feed screws. Information from which the machine part is to be guided may conveniently be presented in drawings or copies thereof e.g. photo-prints, dyeline prints, lofting plates or any type of block.

The apparatus comprises a search head 51 mounted for planar movement in a plane parallel to a line drawing displaying the necessary control information. The search head 51 is movable in two mutually perpendicular directions under the control of two feed screws, shown diagrammatically at 52, 53. Movements are imparted to the feed screws by servo-motors M11, M12 which are energised in accordance with signals derived from the drawing. The search head 51 carries two potentiometer tapping arms arranged to contact two linear potentiometers VR9, VR10 which respectively extend parallel to the feed-screws 52, 53 and which are energised from a battery. Consequently, the potentials tapped by the two tapping arms are a measure of the position of the search head relative to some datum position. The voltage tapped from the potentiometer VR9 is fed as a first control voltage to a power amplifier A26 arranged to energise a servo motor M11 which acts, through suitable gearing, to drive one of the feed screws 52, 53 and to a power amplifier A28 arranged to energise a servo-motor M13 which acts, through suitable gearing, to drive one of the feed screws of the machine part. The voltage tapped from the potentiometer VR10 is fed as a first control voltage to a power amplifier A27 arranged to energise a servo-motor M12 which acts, through suitable gearing, to drive the other feed screw 53, 52 and to a power amplifier A29 arranged to energise a servo-motor M14 which acts, through suitable gearing, to drive the other feed screw of the machine part.

The tapping arms of two further linear potentiometers VR11, VR12 are coupled to the machine part for movement therewith. Consequently, when the machine part is moved in response to energisation of the servo-motors M13, M14, these two tapping arms are moved and the potentials tapped thereby vary. These potentials are fed respectively into the amplifiers A28, A29 as second control voltages which tend to balance the first control voltages applied thereto.

The search head 51 comprises four light sources LP21, LP22, LP23, LP24 arranged to project four patches of light onto the drawing beneath the search head in the form of a cross as shown in FIGURE 17 and a photo-electric cell P.C.A. arranged to "see" all the patches of light and thus to receive light reflected from the drawing. The photo-electric cell P.C.A. is shielded from receiving light directly from the light sources LP1, LP2.

The four light sources LP21, LP22, LP23, LP24 are energised through amplifiers A21, A22, A23, A24 from a master oscilaltor 55 arranged to produce four sinusoidal output signals with a 90 degree phase difference between them. The four light sources are respectively energised by the four signals so that they are energised 90 degrees out of phase with each other. The oscillator 55 is substantially the same as the oscillator described in the first example.

The search head comprises four further photo-electric cells PC21, PC22, PC23, PC24, the outputs of which are fed back to the amplifiers A21, A22, A23, A24 to stabilise the light output of the associated light source and are thus similar in purpose to the photo-electric cells PC1, PC4 in FIGURE 1.

The light reflected into the photo-electric cell PCA will cause that cell to produce an output, which in most circumstances will be a periodically varying output. This output is fed to an amplifier A15 and the amplified signal fed to two phase sensitive detectors PSR11, PSR12. These detectors are substantially the same as the detector PSR1 described in the first example. The control or synchronising signal for the detector PSR11 is taken from the 0 to 180 degree phase signal from the oscillator and the control or synchronising signal for the detector PSR12 is taken from the 90 and 270 degree phase signal from the oscillator. The filtered output signal of the phase sensitive detector PSR11 is fed to the power amplifier A26 and the filtered output signal of the phase sensitive detector PSR12 is fed to the power amplifier A27.

To cause primary movement of the search head over the master drawing, D.C. scan voltages which vary linearly with time are fed into the amplifiers A6, A7 at $x$ and $y$ through resistors $Rx$, $Ry$. The voltages are such the search head is caused to move relatively along a control or route line 70 on the master drawing. If the four light patches fall symmetrically on the line 70 as shown in FIGURE 17, the outputs of the phase sensitive rectifiers PSR11 and PSR12 are zero and consequently the two control signals fed to each of the amplifiers A28, A29 balance the only signal controlling the energisation of the servo-motors M13, M14, are the linearly increasing voltages fed in at $x$ and $y$. However, if the four light patches do not fall symmetrically on the line 70, PSR11 and PSR12 will provide outputs and additional signals will therefore be fed to the amplifiers A6, A7. The servo-motors M11, M12 will therefore be actuated non-linearly and non-linear signals will be fed to the amplifiers A28, A29 from the potentiometers VR9, VR10. The servo-motors M13, M14 will therefore also be actuated non-linearly and the machine part will follow a path dictated by the line 70.

For stability the resistor $Rx$ is connected through a resistor $Ra$ to the line 71 and the resistor $Ry$ is connected through a resistor $Rb$ to the line 72.

If it is desired to take into consideration cutting tool strain, this may be done by feeding signals derived from a strain gauge mounted on the cutting tool into the amplifiers A26, A27 at Z.

In the case of machine control from a drawing it is not, in general, necessary to employ any automatic background measurement since the line/background contrast can be accurately controlled.

The invention is not restricted to the details of the foregoing example. For instance, the vehicle may comprise front and rear wheels which are independently steerable, the rear wheels being associated with duplicate control apparatus as hereinbefore described. This provision enables the vehicle to follow a track having a greater curvature than if the front wheels are steerable. Alternative predetermined routes may be indicated by lines of different colours. In this event, the control apparatus of a truck which is to follow a route defined by a line or lines of one colour would be rendered sensitive only to that one colour, for example by the use of suitable filters.

We claim:

1. Apparatus for following a line marked on a surface providing a background having a different reflectivity to that of the line, which apparatus comprises in combination a scanning unit comprising illuminating means for directing light at the surface so that the line is illuminated and a light sensitive device for receiving light reflected back from the surface, said illuminating means providing two periodically-varying light outputs having a phase difference therebetween and respectively forming areas of illumination in the region of the line, means for moving the scanning unit relatively over the surface and means for analysing the output of the light sensitive device and for providing an output for monitoring the scanning-unit-moving means.

2. Apparatus for following a line marked on a surface providing a background having a different reflectivity to that of the line, which apparatus comprises in combination a scanning unit comprising illuminating means for directing light at the surface so that the line is illuminated and a light sensitive device for receiving light reflected back from the surface, said illuminating means providing two periodically-varying light outputs having a phase difference therebetween and respectively forming areas of illumination in the region of the line, and means controlled by the output of the light sensitive device for effecting relative movement between said scanning unit and said line whereby the scanning unit follows the line.

3. Apparatus for following a line marked on a surface providing a background having a different reflectivity to that of the line, which apparatus comprises in combination a scanning unit comprising illuminating means for directing light at the surface so that the line is illuminated and a light sensitive device for receiving light reflected back from the surface and providing an output indicative of the position of the scanning unit in a direction transverse to the line, said illuminating means providing two periodically-varying light outputs having a phase difference therebetween and respectively forming areas of illumination in the region of the line, means for moving the scanning unit relatively along the length of the line, and means controlled by the output of the light sensitive device for effecting relative movement between the scanning unit and the line in the said direction transverse to the line so that the scanning unit follows the line.

4. Apparatus for following a line marked on a surface providing a background having a different reflectivity to that of the line, which apparatus comprises in combination a scanning unit comprising illuminating means for directing light at the surface so that the line is illuminated and a light sensitive device for receiving light reflected back from the surface, said illuminating means providing two periodically-varying light outputs having a phase difference therebetween and respectively forming areas of illumination in the region of the line, means for amplifying the output of the light sensitive device, means for illuminating the background at a position spaced from the line, a second light-sensitive device for receiving light reflected back from the background, means for comparing the output of the second light sensitive device with the output of the first said light sensitive device and providing an output voltage which is fed to the amplifying means as a gain-control-voltage to maintain the gain thereof substantially constant, means for moving the scanning unit relatively along the length of the line, and means controlled by the output of the amplifying means for effecting relative additional movement between the scanning unit and the line.

5. Apparatus for following a line marked on a surface providing a background having a different reflectivity to that of the line, which apparatus comprises in combination a scanning unit comprising illuminating means for directing light at the surface so that the line is illuminated and a light sensitive device for receiving light reflected back from the surface, said illuminating means providing two periodically-varying light outputs having a phase difference therebtween and respectively forming areas of illumination in the region of the line, means for moving the scanning unit relatively along the length of the line and means controlled by the output of the light sensitive device for effecting relative additional movement between the scanning unit and the line whereby the scanning unit follows the line.

6. Apparatus as claimed in claim 5, in which the said illuminating means comprise, two light sources energized so that the light outputs therefrom are periodically varying and have a phase difference of 180 degrees.

7. Apparatus as claimed in claim 6 in which means are provided for analysing the output of the light sensitive device, said analysing means comprising means for sampling the peak values of the varying output of the light-sensitive device and for providing an output having a magnitude dependent on the amplitude of the peak values of the output of the light-sensitive device.

8. Apparatus as claimed in claim 7 in which the analysing means further comprises means for comparing the phase of the varying output of the light-sensitive device with the phase of a reference signal and for determing the sign (i.e. positive or negative) of the output of the sampling means in accordance with the phase relationship between the output of the light-sensitive device and the reference signal.

9. Apparatus as claimed in claim 8 further comprising means for illuminating the background at a position spaced from the line, a second light-sensitive device for receiving light reflected from the background and providing an output indicative of the reflectivity of the background, means for comparing the output indicative of the reflectivity of the background from the second light-sensitive device with an output indicative of the reflectivity of the line, and means for actuating by the output of the comparison means for selecting the phase of the aforesaid reference signal.

10. Apparatus as claimed in claim 9 in which the output indicative of the reflectivity of the line is derived from the first said light-sensitive device.

11. Apparatus as claimed in claim 10 in which an additional in-phase modulation is superimposed on the two periodically varying light sources whereby a periodically varying output is provided by the first said light-sensitive device which is indicative of the reflectivity of the line, and in which the means for illuminating the background provides a periodically varying light output having a 180 degree phase difference with the additional in-phase modulation superimposed on the light outputs of the first said illuminating means whereby a periodically varying output is provided by the second said light-sensitive device which is indicative of the reflectivity of the background.

12. Apparatus as claimed in claim 11 in which the aforesaid reference-signal-phase-selection-means comprise means for sampling the peak values of the output of the reflectivity-comparing-means and for providing an output having a magnitude dependent on the amplitude of the peak values of the output of the reflectivity-comparing-means.

13. Apparatus as claimed in claim 12 in which the reference-signal-phase-selection-means further comprise means for comparing the phase of the output of the reflectivity-comparing-means with the phase of a second reference signal and for determining the sign (i.e. positive or negative) of the output of the reference-signal-phase-selection-means in accordance with the phase relationship between the output of the reflectivity-comparing-means and the second reference signal.

14. Apparatus as claimed in claim 13 in which the reference-signal-phase-selection-means further comprise switch means actuated by the output of the reference-signal sampling means and for selecting the phase of the first said reference signal.

15. A self propelled vehicle for following a line marked on a surface providing a different reflectivity to that of the line, which vehicle comprises power operated means for steering the vehicle, a scanning unit movable transversely of the vehicle and which comprises illuminating means for directing light at the surface so that the line is illuminated, and a light sensitive device for receiving light reflected back from the said areas in the region of the line, said illuminating means providing two periodically-varying light outputs having a phase difference therebetween respectively forming areas of illumination in the region of the line, means for moving the scanning unit transversely of the vehicle, means controlled from the output of the light sensitive device for actuating the scanning-unit-moving-means to move the scanning unit to a position in which the said areas of illumination fall symmetrically on the line, means for producing a signal indicative of the position of the scanning unit transversely of the vehicle and means controlled by the said signal for actuating the steering means to steer the vehicle so that the scanning unit is moved to a predetermined position in the length of its movement.

16. A self propelled vehicle for following a line marked in a surface providing a different reflectivity to that of the line, which vehicle comprises power operated means for steering the vehicle, a scanning unit movable transversely of the vehicle and which comprises illuminating means for directing light at the surface so that the line is illuminated and a light sensitive device for receiving light reflected back from the said areas in the region of the line, said illuminating means providing two periodically-varying light outputs having a phase difference therebetween and respectively forming areas of illumination in the region of the line, means for amplifying the output of the light sensitive device, means for illuminating the background at a position spaced from the line, a second light-sensitive device for receiving light reflected back from the background, means for comparing the output of the second light sensitive device with the output of the first said light sensitive device and providing an output voltage which is indicative of the difference between the reflectivity of the line and the reflectivity of the background and which voltage is fed to the amplifying means as a gain-control-voltage to maintain the gain thereof substantially constant, means for moving the scanning unit transversely of the vehicle, means controlled from the output of the light sensitive device for actuating the scanning-unit-moving-means to move the scanning unit to a position in which the said areas of illumination fall symmetrically on the line, means for producing a signal indicative of the position of the scanning unit transversely of the vehicle relative to a datum position and means controlled by the said signal for actuating the steering means to steer the vehicle so that the scanning unit is moved to its datum position.

17. A self propelled vehicle for following a line marked on a surface providing a different reflectivity to that of the line, which vehicle comprises power operated means for steering the vehicle, a scanning unit movable transversely of the vehicle and which comprises illuminating means for directing light at the surface so that the line in illuminated and a light sensitive device for receiving light reflected back from the said areas in the region of the line, said illuminating means providing two periodically-varying light outputs having a phase difference therebetween and respectively forming areas of illumination in the region of the line, means for moving the scanning unit transversely of the vehicle, means controlled from the output of the light sensitive device for actuating the scanning-unit-moving-means so that the scanning unit is moved to a position in the width of the vehicle in which the said areas of illumination fall symmetrically on the line, and means controlled by the position of the scanning unit for actuating the steering means so that the vehicle follows the line.

18. A self-propelled vehicle as claimed in claim 17 further comprising means for temporarily removing the control by the output of the light sensitive device of the scanning-unit-moving-means and of the steering-actuating-means, means for rendering said control-removing-means operative, means for actuating the scanning-unit-moving-means when said control thereof from the light-sensitive device is removed to cause the said area of illumination to transfer from the said line to a second similar line marked on the surface, and means for rendering said control-removing means inoperative when the said areas of illumination are transferred to the second line.

19. A self-propelled vehicle as claimed in claim 18, in which said means for rendering said control-removing-means operative and inoperative comprise means for illuminating markings on the surface at the side of the first said line, at least one further light-sensitive device for receiving light reflected from said markings, and switch means controlled by the output of the said further light-sensitive device for switching the control-removing-means between operative and inoperative conditions.

20. A self-propelled vehicle as claimed in claim 19, further comprising means for controlling the propulsion means of the vehicle and actuation means for the propulsion-control-means.

21. A self-propelled vehicle as claimed in claim 20 in which said actuator means comprise further illuminating means, and a further light sensitive device, the construction and arrangement being such that, when the further illuminating means illuminates a reflecting surface, light is reflected back to the further light sensitive device and a signal produced thereby.

22. A self-propelled vehicle as claimed in claim 21, in which the said further illuminating means are arranged to illuminate further markings on the surface at the side of the line as the vehicle travels along the length of the line, the said further marking reflecting light back to the further light sensitive device.

23. A self-propelled vehicle for following a line marked on a surface providing a different reflectivity to that of the line, which vehicle comprises power operated means for steering the vehicle, a scanning unit movable transversely of the vehicle and which comprises illuminating means for directing light at the surface so that the line is illuminated and a light sensitive device for receiving light reflected back from the said areas in the region of the line, said illuminating means providing two periodically-varying light outputs having a phase difference therebetween and respectively forming areas of illumination in the region of the line, means for moving the scanning unit transversely of the vehicle, means controlled from the output of the light sensitive device for actuating the scanning-unit-moving-means to move the scanning unit to a position in which the said areas of illumination fall symmetrically on the line, a potentiometer extending in the direction of movement of the scanning unit, a tapping arm connected to the scanning unit for movement therewith and contacting the potentiometer whereby the potential of the tapping arm is a measure of the position of the scanning unit transversely of the vehicle, and means controlled from the potential of the tapping arm for actuating the steering means to steer the vehicle to a position in which the scanning unit is positioned centrally in the length of its movement.

24. A self-propelled vehicle for following a line marked on a surface providing a different reflectivity to that of the line, which vehicle comprises power operated means for steering the vehicle, a scanning unit movable transversely of the vehicle and which comprises illuminating means for directing light at the surface so that the line is illuminated and a light sensitive device for receiving light reflected back from the said areas in the region of the line, said illuminating means providing two periodically-varying light outputs having a phase difference therebetween and respectively forming areas of illumination in the region of the line, means for moving the scanning unit transversely of the vehicle, means controlled from the output of the light sensitive device for actuating the scanning-unit-moving-means for moving the scanning unit to a position in which the said areas of illumination fall symmetrically on the line, a potentiometer extending in the direction of movement of the scanning unit, a tapping arm connected to the scanning unit for movement therewith and contacting the potentiometer, whereby the potential of the tapping arm is a measure of the position of the scanning unit transversely of the vehicle, a second potentiometer, a second tapping arm therefor, means actuated in accordance with actuation of the steering-means for moving said second tapping arm over the said second potentiometer so that the potential of the said second tapping arm is a measure of the extent of actuation of the steering means, and means controlled from the potentials of the first said tapping arm and of the second said tapping arm for actuating the steering means.

25. A machine controlled from a line marked on a surface providing a background having a different reflectivity to that of the line, which machine comprises a tool holder, a work holder, power operated means for moving the tool holder relative to the work holder, a scanning unit comprising illuminating means for directing light at the surface so that the line is illuminated and a light sensitive device for receiving light reflected back from the surface, said illuminating means providing two periodically-varying light outputs having a phase difference therebetween and respectively forming areas of illumination in the region of the line, means for moving the scanning unit relatively along the length of the line, means controlled by the output of the light sensitive device for effecting relative additional movement between the scanning unit and the line, and means also controlled by the output of the light sensitive device for actuating the means for moving the tool holder relative to the work holder so that the tool holder is moved relative to the work holder in accordance with the configuration of the line.

26. A machine controlled from a line marked on a surface providing a background having a different reflectivity to that of the line, which machine comprises a tool holder, a work holder, power operated means for moving one of the holders in two mutually perpendicular directions, a scanning unit comprising illuminating means for directing light at the surface so that the line is illuminated and a light sensitive device for receiving light reflected back from the surface, said illuminating means providing two periodically-varying light outputs having a phase difference therebetween and respectively forming areas of illumination in the region of the line, means for moving the scanning unit in two mutual perpendicular directions over the surface, means for actuating the scanning-unit-moving-means so that a primary movement is imparted to the scanning unit whereby the surface is scanned, means controlled by the output of the light sensitive device for additionally actuating the scanning-unit-moving-means to effect additional movement of the scanning unit so that the line is continuously scanned thereby, and means also controlled by the output of the light sensitive device for actuating the means for moving the said one holder so that the holder is moved in relation to the said other holder in accordance with the configuration of the line.

References Cited in the file of this patent

UNITED STATES PATENTS

| | | |
|---|---|---|
| 2,489,305 | McLennan | Nov. 29, 1949 |
| 2,868,993 | Henry | Jan. 13, 1959 |